(12) United States Patent
Peters et al.

(10) Patent No.: US 9,208,664 B1
(45) Date of Patent: Dec. 8, 2015

(54) ADJUSTING STRUCTURAL CHARACTERISTICS OF A DEVICE

(71) Applicant: AMAZON TECHNOLOGIES, INC., Reno, NV (US)

(72) Inventors: David Eric Peters, San Jose, CA (US); Bobby Dean Landreth, San Jose, CA (US); John Avery Howard, Palo Alto, CA (US); Shan Cheng, Los Altos, CA (US); Edward A Liljegren, San Francisco, CA (US)

(73) Assignee: Amazon Technologies, Inc., Reno, NV (US)

( * ) Notice: Subject to any disclaimer, the term of this patent is extended or adjusted under 35 U.S.C. 154(b) by 209 days.

(21) Appl. No.: 13/793,733

(22) Filed: Mar. 11, 2013

(51) Int. Cl.
*G08B 7/06* (2006.01)

(52) U.S. Cl.
CPC .......................................... *G08B 7/06* (2013.01)

(58) Field of Classification Search
CPC combination set(s) only.
See application file for complete search history.

(56) References Cited

U.S. PATENT DOCUMENTS

| 2008/0018603 | A1 | 1/2008 | Baraz et al. | |
| 2008/0287167 | A1* | 11/2008 | Caine | 455/575.1 |
| 2009/0002328 | A1* | 1/2009 | Ullrich et al. | 345/173 |
| 2009/0045042 | A1* | 2/2009 | Browne et al. | 204/157.15 |
| 2010/0141407 | A1* | 6/2010 | Heubel et al. | 340/407.1 |
| 2014/0320276 | A1* | 10/2014 | Maschmeyer et al. | 340/407.2 |

FOREIGN PATENT DOCUMENTS

CN 202354640 U * 8/2012

* cited by examiner

*Primary Examiner* — Brian Zimmerman
*Assistant Examiner* — Cal Eustaquio
(74) *Attorney, Agent, or Firm* — Lindauer Law, PLLC

(57) ABSTRACT

A structure of a device, such as a surface coating, is composed of one or more materials that are arranged to change one or more characteristics in response to a stimulus, such as an electrical signal, a magnetic field, application of thermal energy, and so forth. The changed characteristics may include a tactile characteristic, a visual characteristic, or other type of characteristic that is perceivable by a user of the device. A state for the adjustable structure may be determined based on user preference data that is stored on the device or input by a user through a user interface. The state for the adjustable structure may also be automatically determined based on device motion, orientation, environment factors, and so forth.

20 Claims, 13 Drawing Sheets

ADJUSTING STRUCTURAL CHARACTERISTICS OF A DEVICE

BACKGROUND

A mobile device manufacturer may determine the external materials, features, and appearance of a device based on cost considerations, operational considerations for strength, thermal properties, electrical properties, or other considerations. A manufacturer may also design the exterior of a device to achieve a particular cosmetic or aesthetic effect. However, despite the increasing popularity of mobile devices, many users may not be satisfied with the external look and feel of a device as manufactured.

Figure 1:
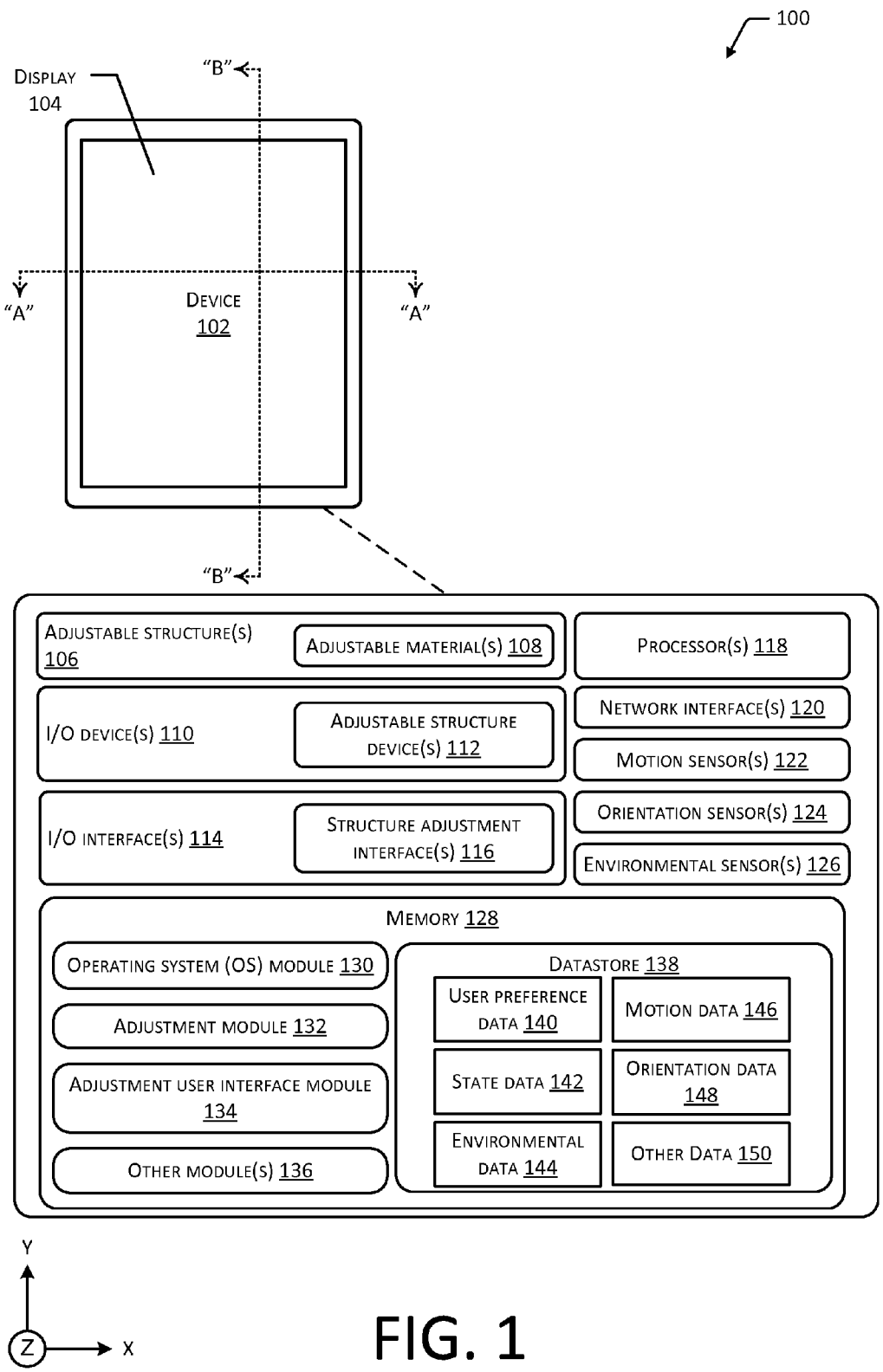
FIG. 1 depicts a schematic of a device configured to perform operations for altering one or more adjustable characteristics of a device structure or surface.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure describes embodiments of systems, methods, and computer-readable media for adjusting one or more tactile, visual, or otherwise perceivable characteristics of a device structure. As used herein, a device structure may refer to any structure, any portion of a structure, or any surface of a structure incorporated into a device. The adjustable characteristic(s) of a structure may include one or more tactile characteristics such as texture, compressibility, topology, shape, and so forth. The adjustable characteristic(s) may include one or more visual characteristics such as a color, a pattern, a reflectance (e.g., albedo), an image, text, and so forth. Further, the adjustable characteristic(s) may include any other type of characteristic that is perceivable by an individual or other observer. In some cases, a device structure may exhibit multiple adjustable characteristics in any combination of tactile, visual, or other type of characteristic. In some implementations, the structure having the adjustable characteristic(s) is at least partly external to the device such that the at least one adjustable characteristic of the structure is perceivable to a user of the device.

In the implementations described herein, a structure of a device may include at least one surface that comprises an outer layer of the structure. This outer layer may have any thickness. The structure, the at least one surface, or both the structure and the at least one surface may comprise one or more materials that alter at least one adjustable characteristic in response to a stimulus. The one or more materials may include one or more of the following: electrorheological materials, magnetorheological materials, elastomeric materials, cholesteric materials, electrophoretic materials, liquid crystal materials, electroactive silicate materials, thermoactive materials, or other types of materials. Such materials may respond to stimuli in the form of electrical signals, applied magnetic fields, applied thermal energies, detected temperature, pH, humidity, pressure, or other environmental factors, or other types of stimuli.

In some implementations, one or more modules on a device may operate to determine a current state for an adjustable characteristic of a structure of the device, and to determine a target state for the adjustable characteristic. If the current state differs from the target state, a stimulus may be sent to alter the adjustable characteristic from the current state to the target state. Such a stimulus may be sent to the structure, or to a device component that is configured to alter the adjustable characteristic of the structure. In some implementations, the stimulus may be discontinued following a determination that the adjustable characteristic is in the target state. In some cases the material(s) that compose the structure may retain the target state following the application of the stimulus, until a subsequent stimulus alters the adjustable characteristic to a new target state. Some materials may persist in the target state for a certain period of time following the application of the stimulus. In such cases, one or more subsequent stimuli may be applied to maintain the adjustable characteristic in the target state.

In some implementations, the target state for the adjustable characteristic may be based at least in part on information received regarding a user for the device. Some implementations may provide a user interface that the user may employ to set a preference for the tactile state, the visual state, or other perceivable state of a device structure. For example, the user interface may include one or more controls to enable a user to adjust a texture, a compressibility, a friction characteristic, or other tactile characteristics of a device structure. As another example, the user interface may include one or more controls to enable a user to adjust a color, a pattern, a reflectance (e.g., albedo), or other visual characteristics of the device structure. In some cases, the user preferences may be stored in memory on the device, and accessed following an authentication or identification of the user on the device.

In some implementations, the target state for the adjustable characteristic of a structure may be automatically determined by a module of the device based on one or more factors. In some implementations, the target state may be based on environmental factors in proximity to the device, where such environmental factors may include temperature, humidity, pressure, local date/time, or other factors. In some implementations, the target state may be automatically determined based on a detected motion of the device such as a velocity or acceleration of the device. In some implementations, a target state may be automatically determined based on a detected orientation of the device. In some implementations, to reduce power usage the adjustable characteristic of the structure may be altered when the device is in use, and not altered when the device is not in use.

Illustrative System

FIG. 1 depicts a schematic 100 of a device 102 that is configured to perform operations for adjusting characteristics of device structure(s), as described herein. Device 102 may be any type of user device including but not limited to mobile phones, tablet computers, electronic book readers, wearable computers, surface computers, laptop computers, implanted computers, thin clients, terminals, game consoles, mobile gaming devices, desktop computers, personal computers, home appliances, and so forth.

In some implementations, the device 102 includes one or more displays 104 to present information to a user of the device 102. The display 104 may employ any display technology, including but not limited to a liquid crystal display (LCD), a light-emitting diode (LED) display, an electrophoretic display, or any other type of display. The device 102 includes one or more adjustable structures 106. The adjustable structure(s) 106 may be at least a portion of any physical structure of the device 102, such as a device casing. In some implementations, the adjustable structure(s) 106 may include at least a portion of the display 104. The adjustable structure(s) 106 may also include one or more surfaces that are at least partly external to the device 102. As described further herein, the adjustable structure(s) 106 may comprise one or more adjustable materials 108 that alter a perceivable characteristic (e.g., tactile or visual characteristic) in response to a stimulus.

Various technologies may be employed to implement the adjustable structure(s) 106. In some implementations, the adjustable structure(s) 106 are solid state components of the device 102, comprising one or more adjustable materials 108 that respond to a stimulus by altering an externally perceivable characteristic of the adjustable structure(s) 106. In some implementations, one or more treatments may be applied to one or more surfaces of the adjustable structure(s) 106. Any of the following adjustable materials 108 may be employed, either alone or in combination, to implement an adjustable structure 106.

For example, an adjustable material 108 may include a substrate composed of an elastomeric material, a silicone material, or other material. For example, implementations may employ a substrate composed of a thermoplastic elastomer (TPE) material such as thermoplastic polyurethane (TPU). The substrate may be injected with or otherwise combined with an ionic material or a dipole material, such that a voltage applied to the substrate may render the ionic or dipole material more or less dense. Such an alteration in the density of the injected material may lead to a tightening or loosening of the substrate. The substrate with injected material may be applied as a surface treatment or coating of an external surface of the adjustable structure 106, so that the tightening or loosening of the substrate may be experienced by a user holding the device 102 as a change in texture, compressibility, shape, or topology of the surface. The substrate with injected material may also be incorporated internally into the adjustable structure 106, so that an applied voltage leads to an expansion or contraction of the adjustable structure 106 and thus changes a shape or topology of the adjustable structure 106.

An external surface treatment or an internal treatment may be applied to the adjustable structure 106, the treatment comprising an adjustable material 108 that includes a electrorheological material, which alters its viscosity, density, or other physical characteristics in response to an applied electrical field caused by an electrical signal. The adjustable material 108 may also include a magnetorheological material, which alters its viscosity, density, or other physical characteristics in response to a magnetic field. The adjustable material 108 may be included in the adjustable structure 106, or may be incorporated into another substance (e.g., a substrate material) as a dispersion or a colloid, and the combination of substrate and dispersion may be incorporated into the adjustable structure 106. In some cases, the material may be employed as a coating, paint, or other type of surface treatment. When a stimulus in the form of an electrical field is applied to the material, its viscosity or density may be altered leading to an adjustment of one or more tactile characteristics of the material. For example, an electrical field may be employed to control a compressibility of the material, altering its smoothness or hardness.

An electroactive silicate material, a polymer dispersed liquid crystal (PDLC), or a cholesteric material such as a cholesteric liquid crystal may be incorporated into the adjustable structure 106. For example, such an adjustable material 108 may be employed as a surface treatment of the adjustable structure 106. When a stimulus in the form of an electrical voltage is applied to such a material, it may exhibit a change in a visual characteristic such as color or darkness.

A thermoactive adjustable material 108 that is responsive to a temperature change (e.g., heat) may be incorporated into an adjustable structure 106, such that a characteristic of the adjustable structure 106 is altered when its temperature changes. For example, a color, texture, compressibility, or other characteristic of the adjustable structure 106 may be altered based on the temperature change that occurs when thermal energy is applied, such as when a user is holding the device 102 or when the device 102 is operating.

An adjustable material 108 that is responsive to a change in pH (e.g., a polyphosphazene) may be incorporated into the adjustable structure 106, such that a characteristic of the adjustable structure 106 is altered in response to a change in pH, acidity, or alkalinity. For example, a color, texture, compressibility, or other characteristic of the adjustable structure 106 may be altered based on the pH change that occurs when a user is holding the device 102.

The above examples of solid state treatments are not limiting. The adjustable material(s) 108 may include any material that responds to an applied stimulus by altering one or more characteristics. The adjustable material 108 may be applied as an external surface treatment to the adjustable structure 106, as an internal treatment or component of the adjustable structure 106, or both externally and internally. In some implementations, the entire adjustable structure 106 or at least one portion of the adjustable structure 106 may be composed of a material that responds to an applied stimulus by altering one or more characteristics.

In some implementations, different adjustable materials 108 or different thicknesses of an adjustable material 108 may be employed in various portions of the adjustable structure 106, so that different portions of the adjustable structure 106 respond differently to one or more applied stimuli. In such cases, the different portions of the adjustable structure 106 may take on different characteristics in response to one or more applied stimuli.

The applied stimulus may include one or more of the following: an electrical signal (e.g., a current, voltage, electrical field, and so forth), a magnetic field, applied thermal energy, electromagnetic radiation anywhere on the electromagnetic spectrum, particle radiation (e.g., alpha radiation, beta radiation, other forms of ionized particle radiation, and so forth), temperature change, pressure change, humidity change, change in pH, or other types of stimuli. The alterable characteristics may include tactile characteristics (e.g., texture, compressibility, shape, topology, and so forth), visual characteristics (e.g., color, hue, darkness, pattern, design, reflectance (e.g., albedo), and so forth), or other perceivable characteristics of the adjustable structure 106.

The device 102 may include one or more input/output (I/O) device(s) 110. The I/O device(s) 110 may include user input devices such as one or more of a keyboard, a mouse, a pen, a game controller, a voice input device, a touch input device, a gestural input device, or other devices. The I/O device(s) 110 may include output devices such as one or more of the display 104, a printer, audio speakers, haptic output actuators, or other devices. In some implementations, the I/O device(s) 110 may be physically incorporated with the device 102 or be externally placed.

In some implementations, the I/O device(s) 110 include one or more adjustable structure devices 112. The adjustable structure device(s) 112 may include one or more devices or mechanisms that alter an adjustable characteristic of the adjustable structure 106 in response to a stimulus. For example, the adjustable structure device(s) 112 may include a plurality of micro-electrical-mechanical (MEMS) devices, or other devices on a micro-scale or nano-scale. Such devices may be deployed as an array on an exterior surface of the adjustable structure 106 or interior to the adjustable structure 106, to alter a perceivable tactile, visual, or other type of characteristic of the adjustable structure 106 in response to an electrical signal.

Moreover, in some implementations the adjustable structure device(s) 112 may include a plurality of piezoelectric haptic actuators that respond to an electrical control signal by vibrating. Such vibrations may stimulate nerve receptors (e.g., Pacinian or Lamellar receptors) in a user of the device 102. This stimulation may create a perception in the user that a surface of the adjustable structure 106 has a particular texture, even if the surface itself has not physically altered its texture. Such actuators may be placed on or below a surface of the adjustable structure 106, to cause a user to experience a sensation of a texture in the surface.

In some implementations, the adjustable structure device(s) 112 may include one or more fluid-filled bladders imbedded in the adjustable structure 106. A mechanism may add fluid to the bladder(s), remove fluid from the bladder(s), or otherwise alter the pressure or volume of the fluid to alter a surface characteristic of the adjustable structure 106.

In cases where the adjustable structure(s) 106 respond to electrical signals, electromagnetic fields, or applied thermal energy, the adjustable structure device(s) 112 may include devices to generate the electrical signals, the electromagnetic fields, or the thermal energy respectively based on instructions received from one or more other modules of the device 102.

The device 102 may include one or more I/O interfaces 114 to allow the device 102 to communicate with other devices, and to allow other components or modules of the device 102 to communicate with the I/O device(s) 110. The I/O interface(s) 114 may enable information to be transferred in or out of the device 102 through serial communication, parallel communication, or both serial communication and parallel communication. For example, the I/O interface(s) 114 may comply with the RS-232 standard for serial ports, or with the Institute of Electrical and Electronics Engineers (IEEE) 1284 standard for parallel ports. As another example, the I/O interface(s) 114 may be configured to provide a universal serial bus (USB) connection compliant with the standards promulgated by the USB Implementers Forum, Inc. of Beaverton, Oreg. Other types of I/O interface(s) 114 may be employed.

In some implementations, the I/O interface(s) 114 may include one or more structure adjustment interface(s) 116 to enable modules of the device 102 to communicate with the adjustable structure(s) 106, the adjustable structure device(s) 112, or both. For example, the structure adjustment interface(s) 116 may enable a stimulus to be sent to one or more of the adjustable structure(s) 106 or the adjustable structure device(s) 112 to alter a characteristic of an adjustable structure 106 of the device 102 as described herein.

The device 102 may include one or more processors 118 configured to execute one or more stored instructions. The processor(s) 118 may comprise one or more cores. The device 102 may also include one or more network interfaces 120 to enable communications between the device 102 and other devices over a network. Such network interface(s) 120 may include one or more network interface controllers (NICs) or other types of transceiver devices configured to send and receive communications over a network. The device 102 may also include one or more busses or other internal communications hardware or software that allow for the transfer of data between the various modules and components of the device 102.

In some implementations, the device 102 may include one or more sensors of various types to collect data regarding the device or data regarding an environment at the device or in proximity to the device. For example, the device 102 may include one or more motion sensors 122 to detect or measure a motion of the device 102. Such motions may include a linear velocity or acceleration of the device 102 in any direction, or an angular velocity or acceleration of the device 102 about any axis. For example, the motion sensor(s) 122 may include one or more accelerometers.

The device 102 may also include one or more orientation sensors 124 to detect or measure an orientation of the device. For example, the orientation sensor(s) 124 may include one or more accelerometers or gyroscopic sensors to measure a degree to which the device 102 is being held horizontally, vertically, or in an orientation that is relative to another direction.

The device 102 may also include one or more environmental sensors 126 to detect environmental factors at a location of the device 102, or in proximity to the device 102. For example, the environmental sensor(s) 126 may include one or more sensors to detect or measure one or more of the following: temperature, barometric pressure, humidity, contact pressure (e.g., due to the device 102 being held), or pH. The environmental sensor(s) 126 may also include one or more modules that receive and interpret signals to determine local or universal time. The environmental sensor(s) 126 may also include one or more modules that receive and interpret signals to determine a location of the device 102 such as through the global positioning system (GPS), detection of cell tower(s), detection of wireless local area networks (WLANs), and so forth.

The device 102 includes one or more memories, described herein as memory 128. The memory 128 comprises one or more computer-readable storage media ("CRSM"). The CRSM may be any one or more of an electronic storage medium, a magnetic storage medium, an optical storage medium, a quantum storage medium, a mechanical computer storage medium, and so forth. The memory 128 provides storage of computer readable instructions, data structures, program modules, and other data for the operation of the device 102.

The memory 128 may include at least one operating system (OS) module 130. The OS module 130 is configured to manage hardware resources such as the adjustable structure(s) 106, the I/O device(s) 110, the I/O interface(s) 114, the network interface(s) 120, the motion sensor(s) 122, the orientation sensor(s) 124, the environmental sensor(s) 126, and so forth, and to provide various services to applications or modules executing on the processor(s) 118.

In some implementations, the memory 128 includes an adjustment module 132, which performs operations for device structure adjustment. Such operations are described further with reference to FIGS. 7-11.

The memory 128 may also include a user interface module 134, which may provide a user interface to enable a user to control structure adjustment operations of the device 102, or receive information regarding such operations. Such a user interface may be provided as a graphical user interface (GUI), a command-line user interface, or other type of user interface. An example user interface is described with reference to FIG. 6.

Other modules 136 may also be included in the memory 128. These other modules 136 may include, but are not limited to, user identification or authentication modules, access control modules, and so forth.

In some implementations, the memory 128 also includes a datastore 138 to store information for operations of the device 102. The datastore 138 may comprise a database, array, structured list, tree, or other data structure. The datastore 138 may store user preference data 140, describing preferences of one or more users for adjustable characteristics of device structures. The datastore 138 may store state data 142, describing current or historical states of one or more adjustable structures 106 of the device 102, relative to tactile, visual, or other types of characteristics. The datastore 138 may store environmental data 144 received from the environmental sensor(s) 126 or received from an external device or service. The datastore 138 may store the motion data 146 received from the motion sensor(s) 122, and the orientation data 148 received from the orientation sensor(s) 124. The datastore 138 may also store other data 150, such as user account or authentication information, and so forth.

Figure 2:
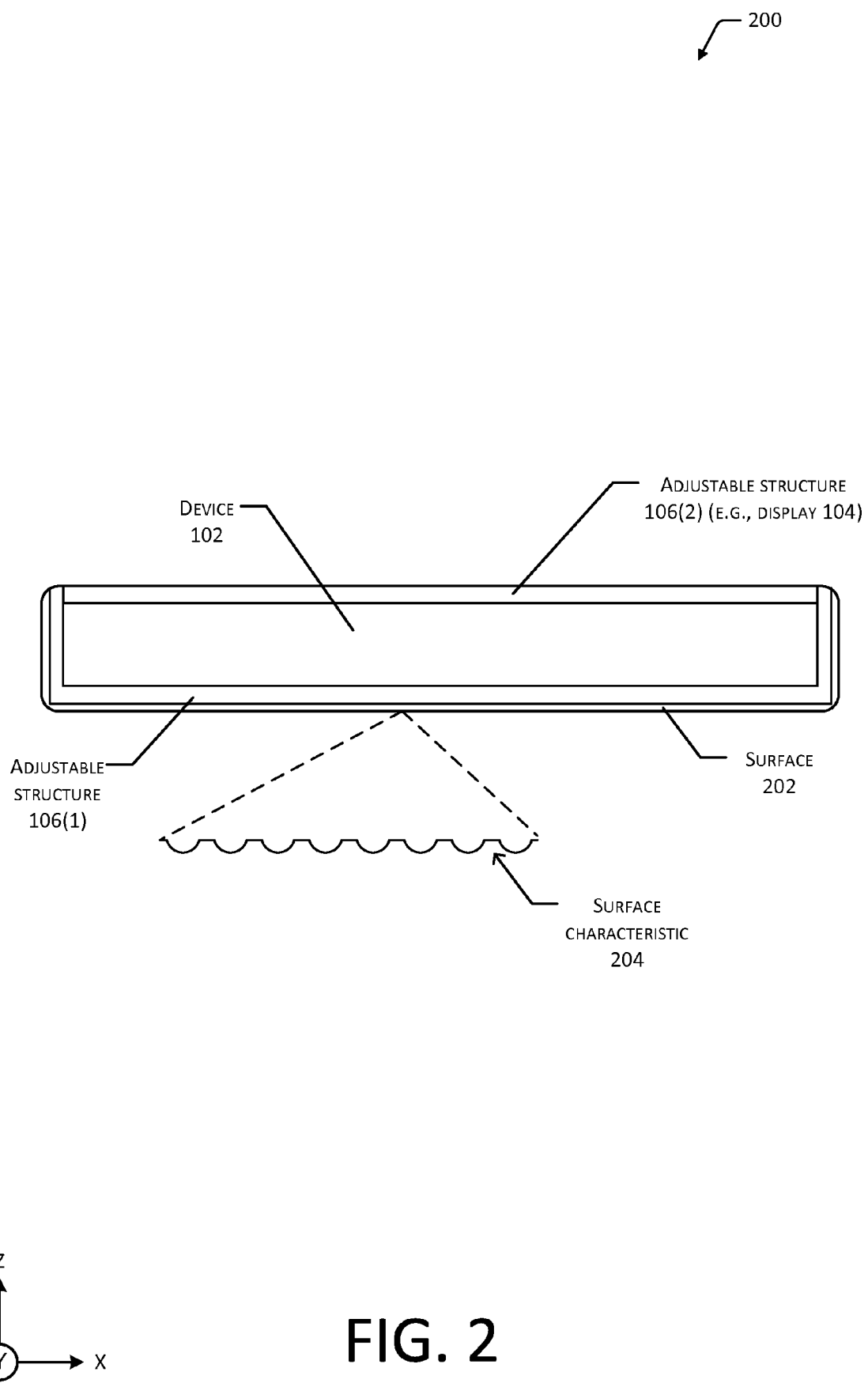
FIG. 2 depicts a side view of the device configured to perform operations for altering one or more adjustable characteristics of the device structure or surface.

FIG. 2 depicts a schematic 200, showing a side view of the device 102 along the "A" or "B" axis as shown in FIG. 1. In the example shown, the device 102 includes an adjustable structure 106(1) that is an external case of the device 102, and an adjustable structure 106(2) that is the display 104. The adjustable structure 106(1) includes a surface 202, in this example an external surface of the adjustable structure 106(1). Implementations support any number of surface(s) 202 or any number of adjustable structures 106. In the example shown, the surface 202 forms an external surface layer, coating, or portion of the adjustable structure 106(1), and has a surface characteristic 204 that is adjustable in response to a stimulus. In the example of FIG. 2, the surface characteristic 204 is a tactile characteristic for a texture (e.g., roughness or smoothness). Implementations support the adjustable structure 106 having any number of surfaces 202 with adjustable characteristics that may include tactile, visual, or other types of perceivable characteristics. Implementations also provide for adjustable characteristics to interior portions of the adjustable structure(s) 106.

In the example of FIG. 2, the adjustable structure 106(2) includes at least a portion of the display 104. In some implementations, the display 104 may be configured to accept one or more stimuli which alter a perceivable tactile characteristic of the display 104, such as a compressibility, texture, or friction characteristic (e.g., a coefficient of friction) of the display 104.

Figure 3:
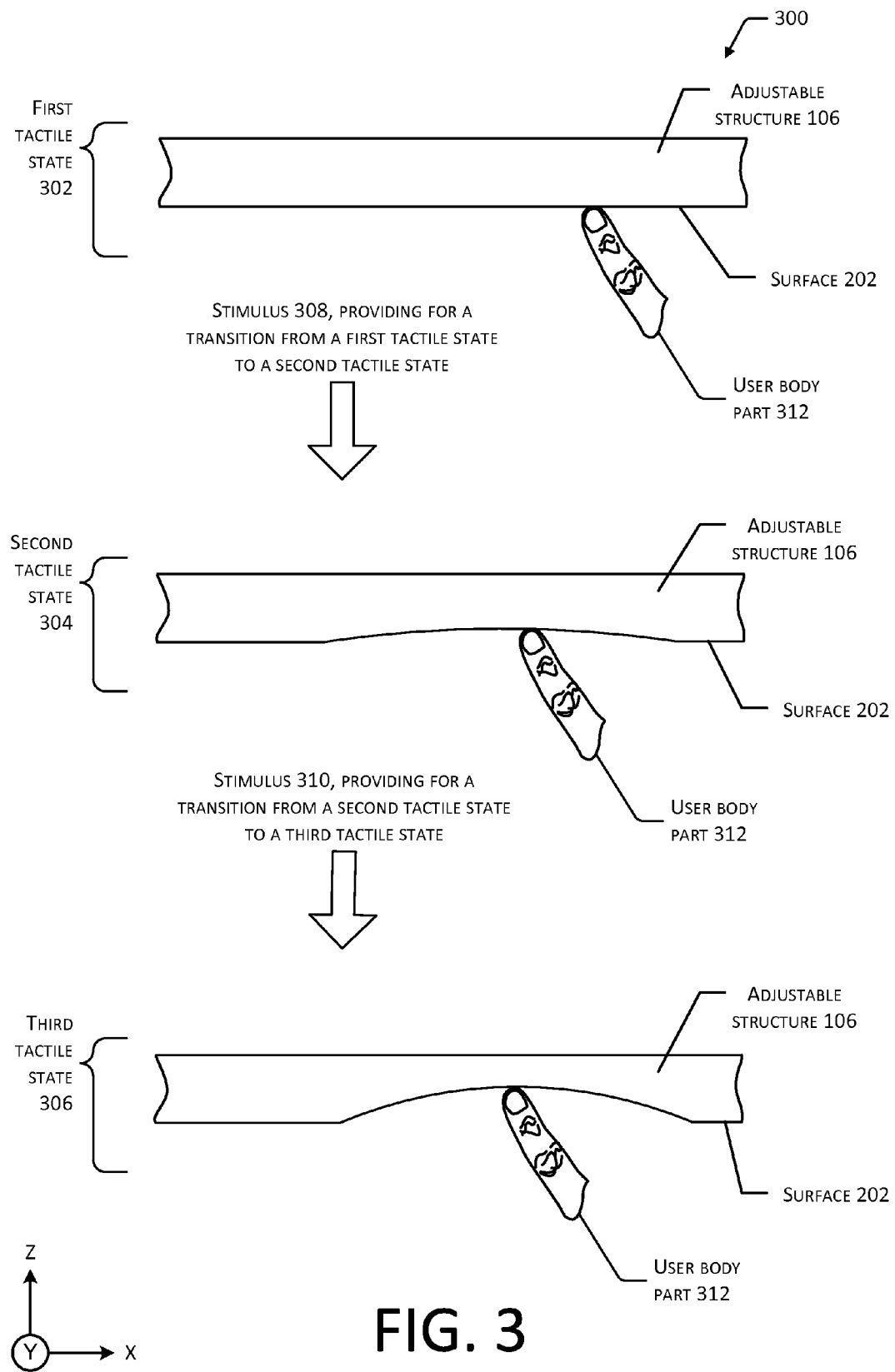
FIG. 3 depicts transitions between various exemplary tactile states for a compressibility or rigidity of the device structure or surface.

FIG. 3 depicts a schematic 300 showing transitions between various examples of tactile states for a compressibility or rigidity of the adjustable structure 106 or of a surface 202 of the adjustable structure 106. The schematic 300 depicts a first tactile state 302 for the adjustable structure 106. In the example, the first tactile state 302 is a substantially rigid, non-compressible tactile state. The second tactile state 304 is an intermediate tactile state that is somewhat less rigid or more compressible than the first tactile state 302. The third tactile state 306 is even more compressible or less rigid than the second tactile state 304.

A stimulus 308 is provided to the adjustable structure 106, to provide for a transition from the first tactile state 302 to the second tactile state 304. A stimulus 310 is provided to the adjustable structure 106, to provide for a transition from the second tactile state 304 to the third tactile state 306. In some implementations, the stimulus 308 and the stimulus 310 may be provided via the structure adjustment interface(s) 116 operating under the control of the adjustment module 132.

In this example, the varying compressibility of the first tactile state 302, the second tactile state 304, and the third tactile state 306 is illustrated as a user body part 312 (e.g., a finger) being able to compress the adjustable structure 106 to varying degrees. For the purposes of illustration, the force applied by the user body part 312 to the adjustable structure 106 may be considered to be the substantially equal across the tactile states 302, 304, and 306, so that the amount of compression illustrates a varying compressibility of the tactile states 302, 304, and 306. The varying rigidity or compressibility of the adjustable structure 106 may be perceivable to the user through other means, such as through a bounciness, elasticity, buoyancy, flexibility, or recoil of the adjustable structure 106.

Figure 4:
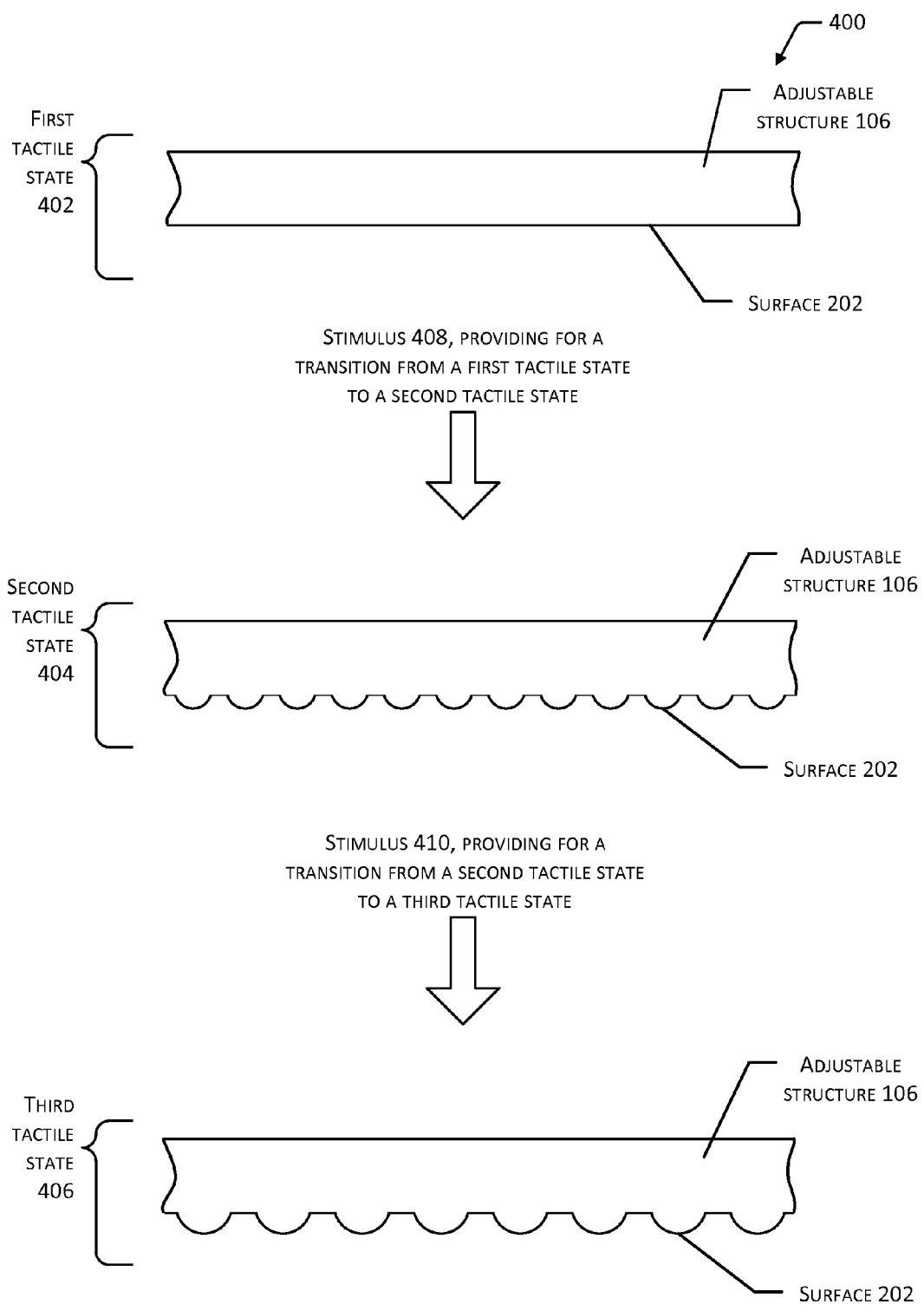
FIG. 4 depicts transitions between various exemplary tactile states for a texture of the device surface.

FIG. 4 depicts a schematic 400 showing transitions between various examples of tactile states for a texture of the adjustable structure 106 or its surface 202. The schematic 400 depicts a first tactile state 402 for the adjustable structure 106. In the example, the first tactile state 402 is a substantially smooth tactile state of the adjustable structure 106. The second tactile state 404 is an intermediate tactile state of the adjustable structure 106 that is somewhat rougher or less smooth than the first tactile state 402. The third tactile state 406 is a substantially rough tactile state of the adjustable structure 106, which is even rougher than the second tactile state 404.

A stimulus 408 is provided to the adjustable structure 106, to signal a transition from the first tactile state 402 to the second tactile state 404. A stimulus 410 is provided to the adjustable structure 106, to signal a transition from the second tactile state 404 to the third tactile state 406. In some implementations, the stimulus 408 and the stimulus 410 may be provided via the structure adjustment interface(s) 116 operating under the control of the adjustment module 132.

Although FIG. 4 shows examples of an adjustable structure 106 having surface textural features that are convex or outwardly protruding, implementations are not so limited. Any type of tactile surface is supported including surfaces with concave features, regular or irregular patterns or textures, symmetric or asymmetric patterns or textures, and so forth.

Figure 5:
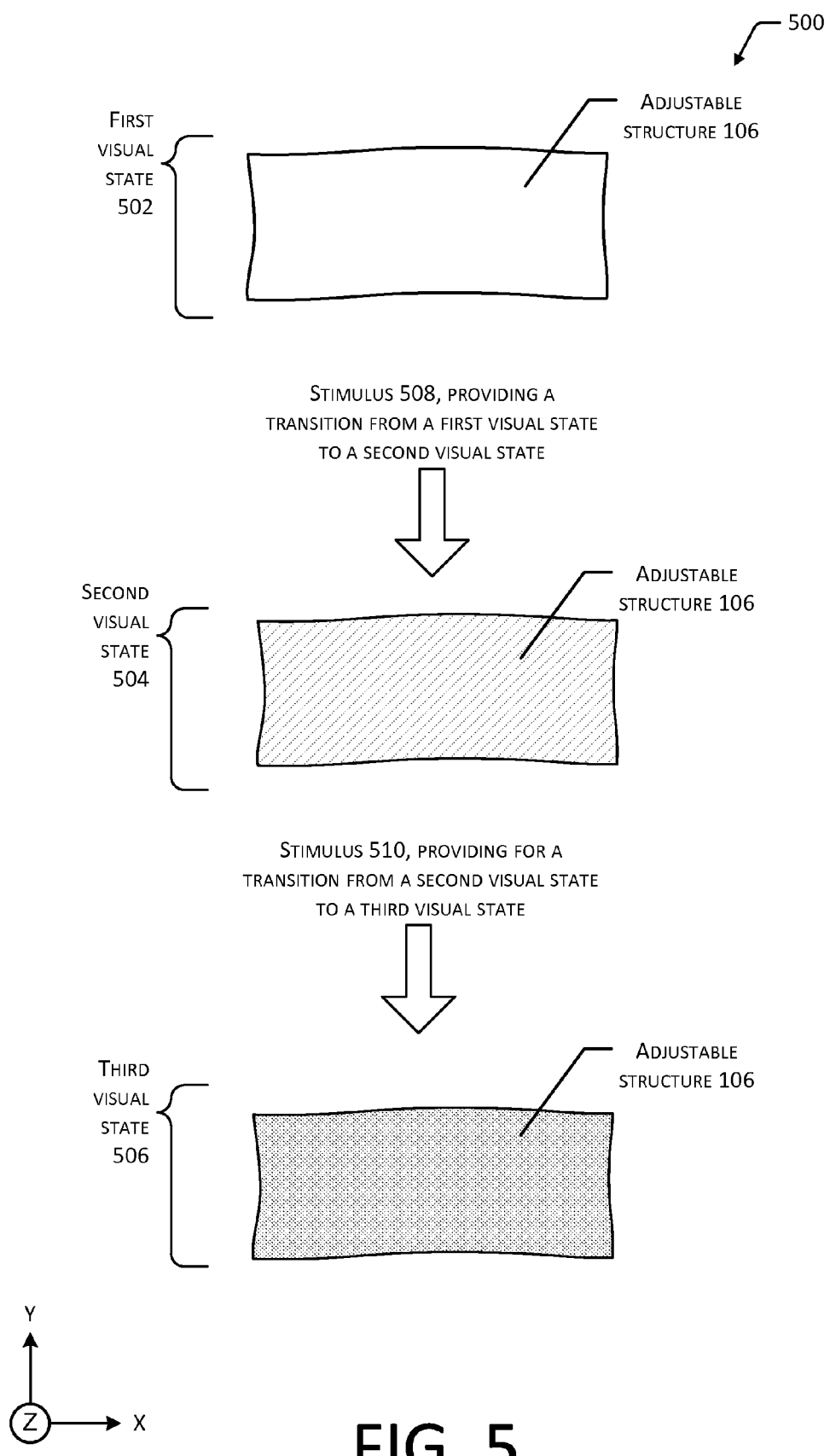
FIG. 5 depicts transitions between various examples of visual states of a surface of the device.

FIG. 5 depicts a schematic 500 showing transitions between various examples of visual states of the adjustable structure 106 or its surface 202. The schematic 500 depicts a first visual state 502 for the adjustable structure 106. In the example, the first visual state 502 is a light colored visual state of the adjustable structure 106. The second visual state 504 is an intermediate visual state of the adjustable structure 106 that is somewhat darker colored than the first visual state 502. The third visual state 506 is a substantially dark visual state of the adjustable structure 106, which is even darker than the second visual state 504.

A stimulus 508 is provided to the adjustable structure 106, to provide for a transition from the first visual state 502 to the second visual state 504. A stimulus 510 is provided to the adjustable structure 106, to provide for a transition from the second visual state 504 to the third visual state 506. In some implementations, the stimulus 508 and the stimulus 510 may be provided via the structure adjustment interface(s) 116 operating under the control of the adjustment module 132.

Figure 6:
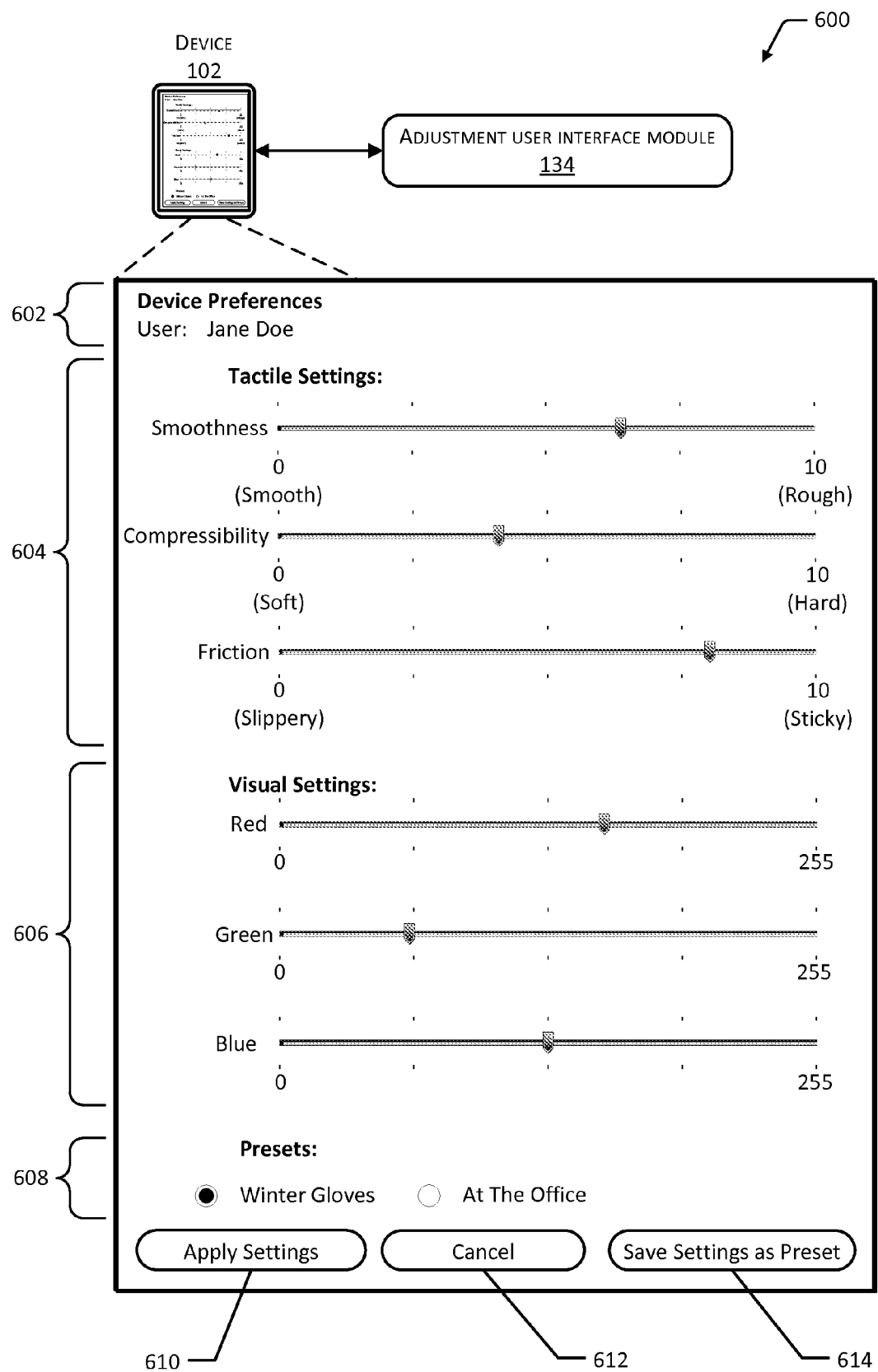
FIG. 6 depicts an example user interface for altering one or more adjustable characteristics of the device structure, which may include a surface.

FIG. 6 depicts an example user interface 600 that enables a user to set preferences for adjustable characteristics of one or more adjustable structures 106 of the device 102. In some implementations, the user interface 600 is provided by the adjustment user interface module 134 executing on the device 102. A user may login to the user interface 600, or be otherwise identified. The user interface 600 may include a section 602 that displays the user currently interacting with the user interface 600. The user interface 600 may include a section 604 that displays one or more tactile settings for the adjustable structure(s) 106, and that enables a user to change the one or more tactile settings. The user interface 600 may include a section 606 that displays one or more visual settings for the adjustable structure(s) 106, and that enables a user to change the one or more visual settings. In some implementations, the user interface 600 may include other sections to enable the viewing and changing of other types of settings for perceivable surface characteristics.

When the user initiates interaction with the user interface 600, the adjustment user interface module 134 may query the datastore 138 to determine whether the user preference data 140 is currently stored for the user. If so, the sections 604 and 606 may display the current preferences for the user. For example, as shown in section 604 the user "Jane Doe" currently prefers a smoothness setting of approximately 7 on a scale of 0 to 10, a compressibility setting of approximately 4 on a scale of 0 to 10, and a friction setting of approximately 8 on a scale of 0 to 10. As shown in section 606, the user "Jane Doe" currently prefers red, green, and blue color settings of approximately 160, 64, and 127 respectively.

Some implementations may provide support for one or more presets, where each preset is a collection of one or more settings that have previously been defined and stored. Presets may be stored on the device 102, in the datastore 138, or on an external device. In some cases, a preset may include one or more settings that configure the device 102 for a particular use scenario or situation. In the example of FIG. 6, the user interface 600 includes a section 608 listing two example presets. The example preset "winter gloves" may include settings that alter an adjustable structure 106 to be very rough but highly compressible, so that the device 102 is easier to use while wearing gloves. The example preset "at the office" may include settings for a smooth surface and medium compressibility. One or more presets may be predefined for one or more users. Implementations may also provide a user with the ability to define and store personalized presets.

The user may use various controls provided by the user interface 600 to input new preferences for various perceivable characteristics. The user interface 600 may include a control 610 to save the newly input preferences, and a control 612 to return to the currently saved preferences and to cancel recent changes input via the user interface 600. The user interface 600 may also include a control 614 to save the current settings as a preset. For example, control 614 may bring up a dialog that prompts the user to enter a name or storage location for the preset. The user interface 600 may also include any number of controls or other elements to enable a user to download settings or presets, upload settings or presets, share settings or presets with other users, and so forth.

The user interface 600 may include any number of controls or other elements to enable a user to view and change settings for tactile characteristics, visual characteristics, and other types of perceivable characteristics. Tactile characteristics include, but are not limited to, texture, compressibility, topology, a coefficient of friction, or shape. Visual characteristics include, but are not limited to, color, pattern, textual information, image, or reflectance (e.g., albedo).

Although FIG. 6 depicts the user interface 600 as including slider type controls for viewing and setting preferences, implementations are not so limited. Any type of control or user interface element may be employed, including but not limited to button, drop down lists, tree lists, text inputs, numeric inputs, and so forth. Moreover, such user interface elements may be arranged in any configuration within one or more pages, screens, dialogs, or views included in the user interface 600. Accordingly, the example shown in FIG. 6 is not limiting of implementations.

Illustrative Processes

Figure 7:
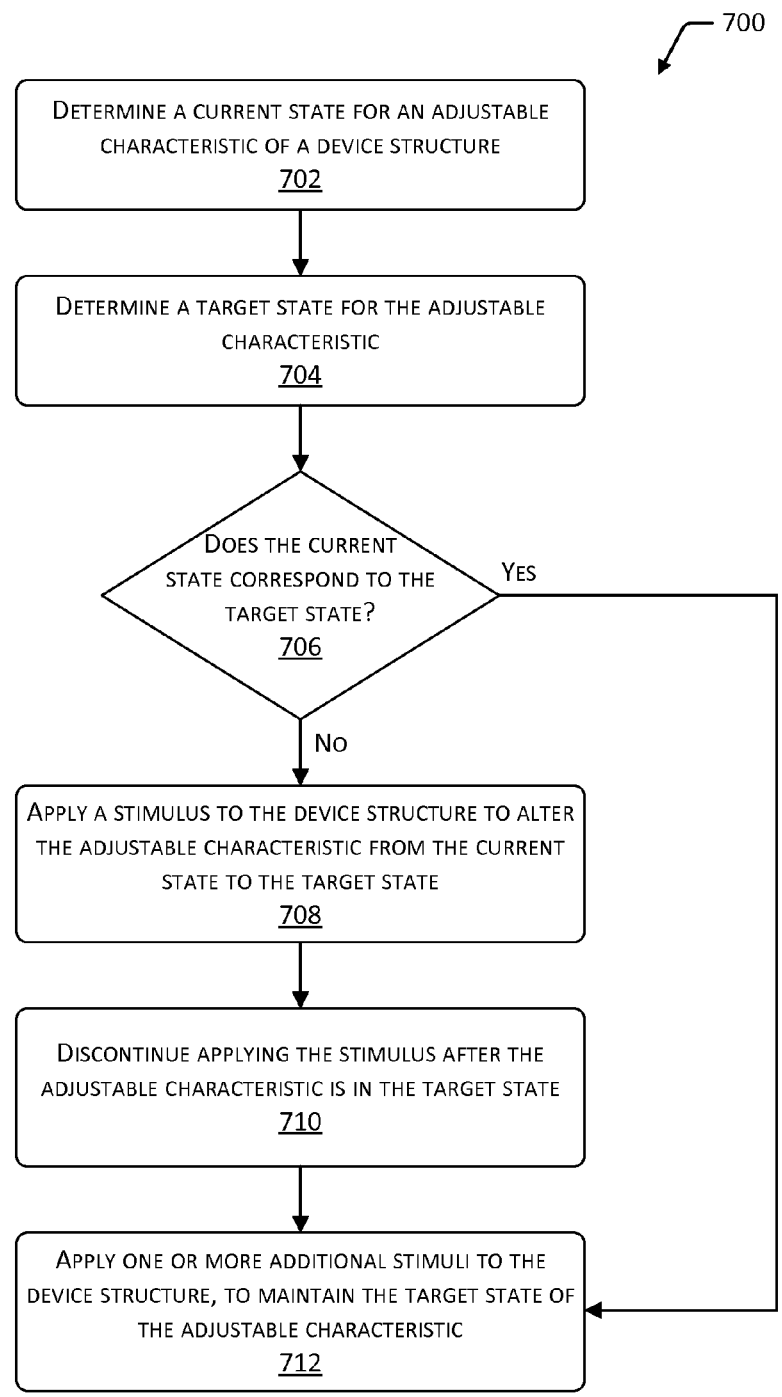
FIG. 7 depicts a flow diagram of an example process for altering one or more adjustable characteristics of a device structure, which may include a surface.

FIG. 7 depicts a flow diagram 700 of an example process for altering one or more adjustable characteristics of an adjustable structure 106 of the device 102. In some implementations, the steps shown may be performed on the device 102 by the adjustment module 132. At 702, in some implementations a determination is made of a current state for an adjustable characteristic of the adjustable structure 106. This determination may be made based on examining or querying the datastore 138 to determine whether the state data 142 indicates a current state for the adjustable structure 106. In cases where the datastore 138 does not store current state data, a default state may be assumed for the adjustable structure 106.

At 704, a determination is made of a target state for the adjustable characteristic. In some implementations, this determination may be based on a user indication or a user preference. Such implementations are described further with reference to FIG. 8. In some implementations, the determination may be made automatically based on one or more criteria. Such implementations are described further with references to FIGS. 9-11.

At 706, a determination is made whether the current state matches or otherwise corresponds to the target state. If the determination is negative, then at 708 at least one stimulus is applied to the adjustable structure 106 to alter the adjustable characteristic from the current state to the target state. The at least one stimulus may include one or more of an electrical signal, an application of a magnetic field, an application of thermal energy, or other types of stimulus. In some implementations, the at least one stimulus may be applied based on a determination that the device 102 is currently in use. Such implementations are described further with reference to FIG. 12. In some implementations, the at least one stimulus may be applied to one or more portions of the adjustable structure 106 that are currently in physical contact with a user. Such implementations are described further with reference to FIG. 13.

In some implementations, where maintaining the target state includes continuously providing the at least one stimulus to the adjustable structure 106, the at least one stimulus may continue until an indication is received of a change in the target state. In other implementations, at 710 the at least one stimulus may be discontinued after the adjustable characteristic is in the target state. This may occur in implementations where the adjustable structure 106 is composed of an adjustable material 108 that persists in the target state following the application of the at least one stimulus. In some cases, the adjustable material 108 may persist in the target state during a power off, sleep, or hibernation of the device 102, such that the adjustable structure 106 is still in the target state when the device 102 powers on, wakes up, or is reactivated.

Some adjustable materials 108 may persist in the target state for a certain period of time following the application of the stimulus. In implementations where the adjustable structure 106 is composed of such materials, at 712, one or more subsequent stimuli may be applied to maintain the target state. Such additional stimuli may be applied at a predetermined frequency, or may be applied based on a determination that the adjustable characteristic has changed from the target state. If the determination at 706 is positive, the process may proceed to 712 and apply the one or more subsequent stimuli in implementations where the additional stimuli maintain the target state.

Figure 8:
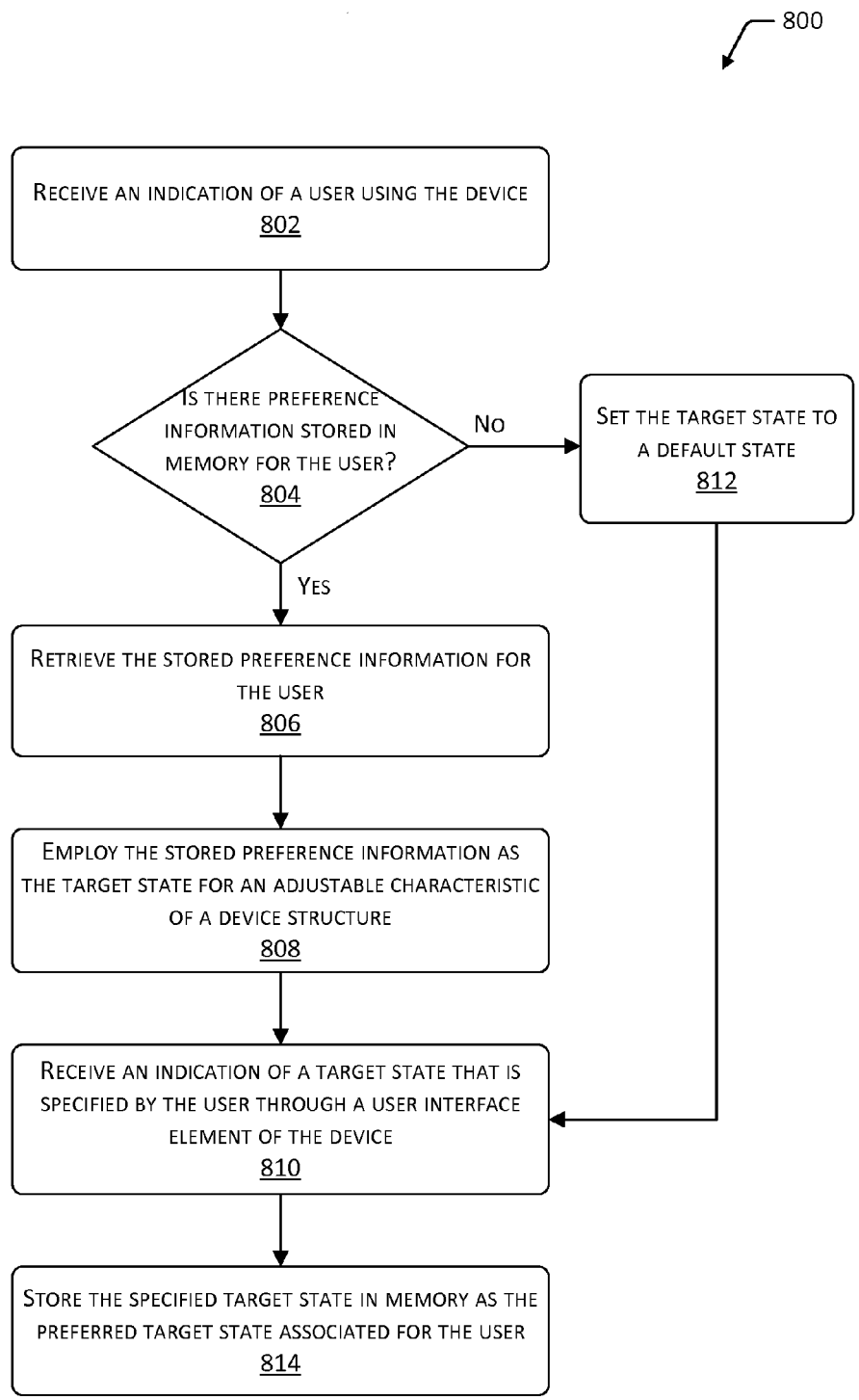
FIG. 8 depicts a flow diagram of an example process for determining a target state for an adjustable characteristic based on a user indication.

FIG. 8 depicts a flow diagram 800 of an example process for determining a target state for an adjustable characteristic of the adjustable structure 106 of the device 102 based on a user indication. In some implementations, the steps shown may be performed on the device 102 by the adjustment module 132.

At 802, an indication is received of a user using the device 102. In some cases, this may be an indication of a user login to the device 102, an authentication of the user to use the device 102, or some other identification of the user. The user identification may be based on a username, password, passcode, biometric data (e.g., fingerprint, retinal scan), voice recognition, facial recognition, identifying gestural data, gait analysis data, or other identifying data for the user.

At 804, a determination is made whether there is preference information for the identified user stored in the memory 128 of the device 102, such as user preference data 140. If the determination at 804 is positive, then at 806 the stored preference information is retrieved from datastore 138. In some implementations, the user preference data 140 is stored on another device that is external to the device 102. In such cases, the user preference data 140 may be retrieved from the external device at 806. At 808, the stored preference information is employed to set the target state for the adjustable characteristic, as described with reference to FIG. 7.

At 810, a subsequent indication may be received that the user has specified a new target state for the adjustable characteristic. Such a user preference may be input by the user through the user interface 600 as described above, or through other means, and may include a user's request for a change in the adjustable characteristic. In some implementations, the process may continuously or periodically monitor for a user request of a change in the adjustable characteristic.

If the determination at 804 is negative, at 812 the target state may be set to a default state for the adjustable characteristic. In some cases, the default state may be a state that the adjustable structure 106 is in following the manufacture of the device 102, or may be a state that the device 102 is placed into before it is shipped from a manufacturer to the user or to a retailer. In some cases, the default state may be the lowest power consuming state available for the adjustable characteristic. After the target state is set to the default state at 812, continuous or periodic monitoring for an expressed user preference may commence at 810.

At 814, after receiving an indication of a target state specified by the user, the specified target state may be stored in the memory 128 on the device 102. The specified target state may be stored as the user preference data 140, enabling the adjustable structure 106 to be restored to the user's preferred state during a subsequent use of the device 102 by the user. In some cases, the user's preferred state may be stored on an external device as described above. The steps above may provide for a personalization of the device 102, such that each of the multiple users of the device 102 may have his or her own user preference saved and applied to the adjustable structure 106 when using the device 102.

Figure 9:
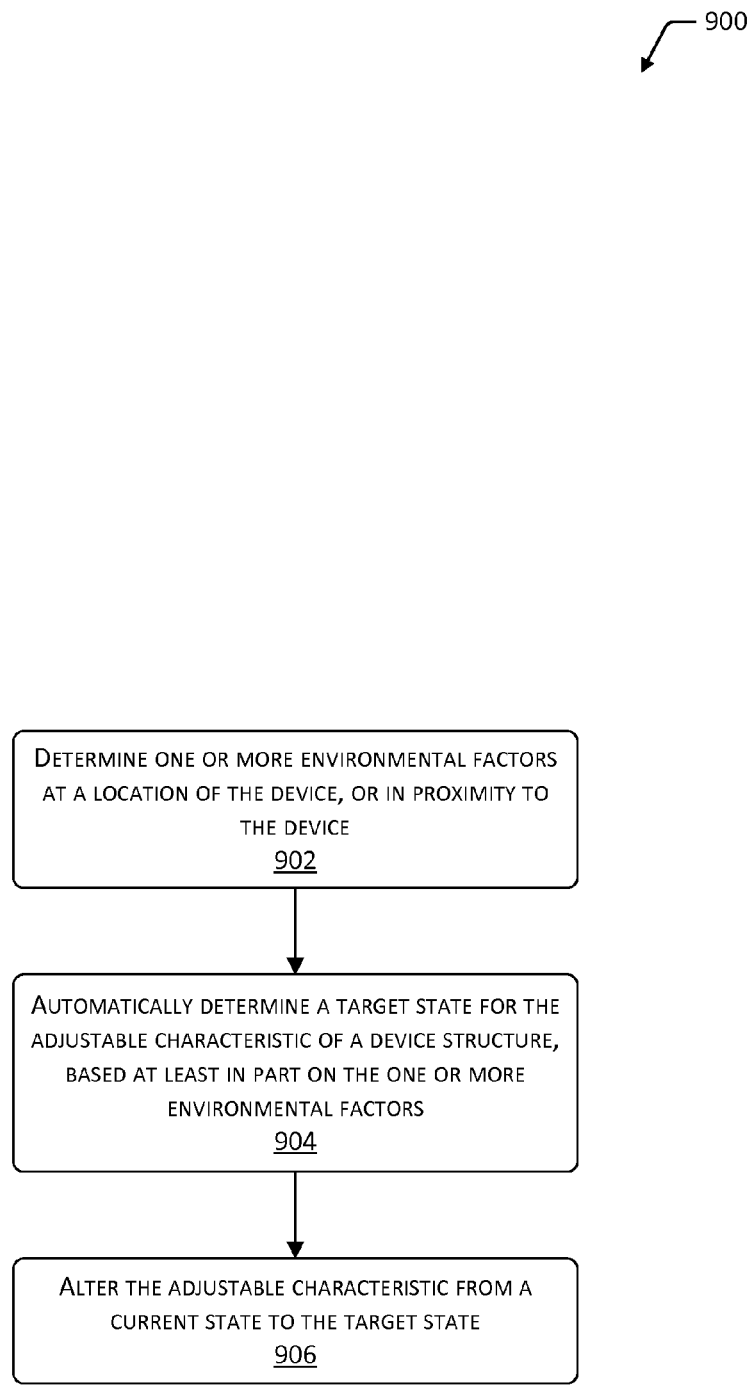
FIG. 9 depicts a flow diagram of an example process for automatically determining a target state for an adjustable characteristic, based on one or more environment factors.

FIG. 9 depicts a flow diagram 900 of an example process for automatically determining a target state for an adjustable characteristic of the adjustable structure 106 of the device 102, based on one or more environmental factors. In some implementations, the steps shown may be performed on the device 102 by the adjustment module 132.

At 902, one or more environmental factor(s) are determined at a location for the device 102, or in proximity to the device 102. Such environmental factors may include, but are not limited to, temperature, barometric pressure, humidity, wind speed, contact pressure on the device 102 (e.g., physical pressure from a user holding the device 102), pH, an amount of light impacting the device 102, location, local date and time, universal date and time, or other environmental factors. In some cases, such environmental data may be received from one or more modules of the device 102, such as the environmental sensor(s) 126 and stored in the datastore 138 as the environmental data 144. In some cases, the environmental data may be received from a remote device that is external to the device 102. In some cases, the environmental data may be provided by a user of the device 102.

At 904, the target state for the adjustable characteristic of the adjustable structure 106 may be automatically determined based at least in part on the environmental factor(s). For example, in some cases a user may be more likely to drop the device 102 when it is hot or humid, or when the measured pH indicates that the user's hands are sweaty. In such cases, the texture or the compressibility of the adjustable structure 106 may be altered to be rougher, easier to grip, and thus less likely to slip from a user's grasp. As another example, based on the time of day or the amount of light impacting the device 102, the adjustable structure 106 may be altered to a lighter color to make the device 102 easier for a user to find in the dark.

At 906, the adjustable characteristic may be altered from a current state to the automatically determined target state, as described above.

Figure 10:
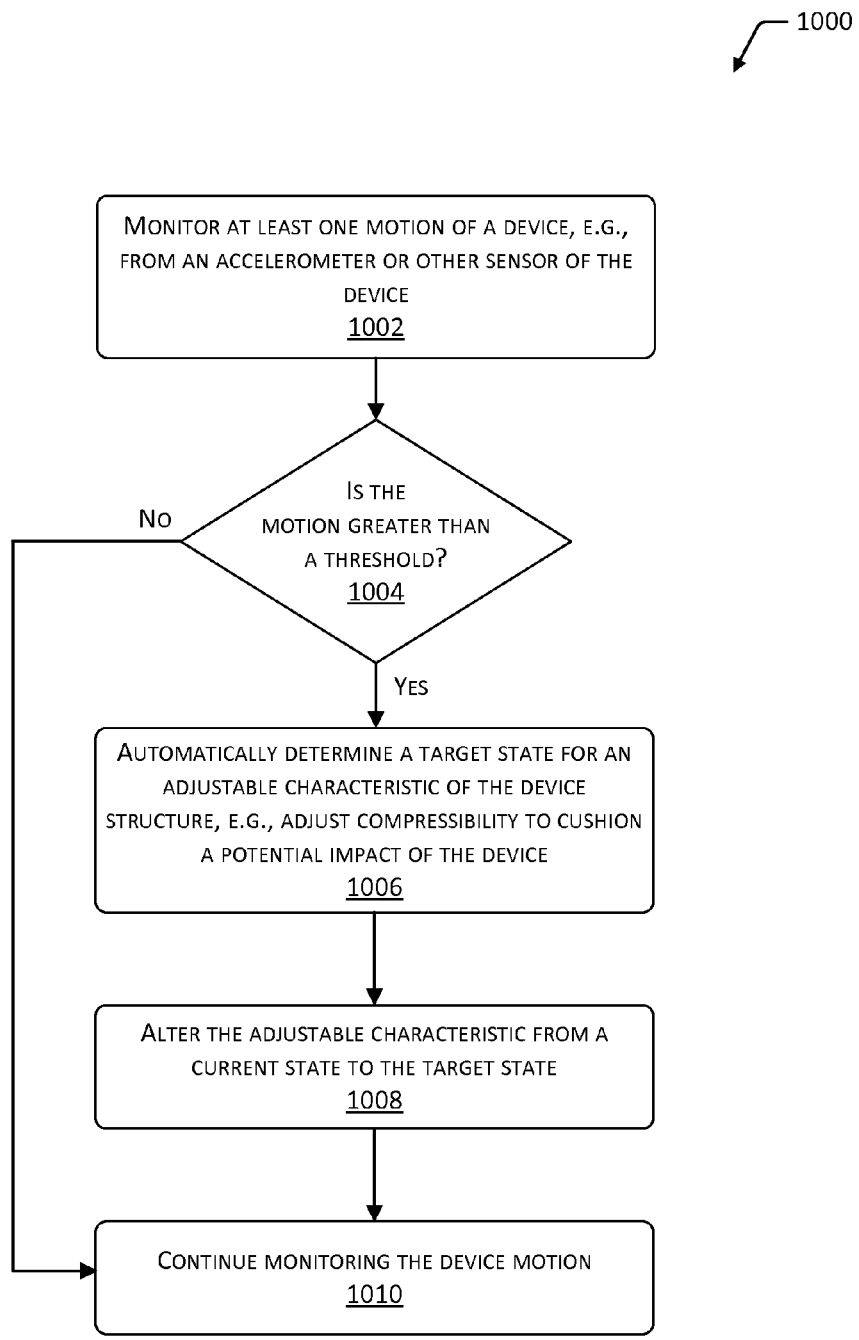
FIG. 10 depicts a flow diagram of an example process for automatically determining a target state for an adjustable characteristic of a device, based on at least one monitored motion of the device.

FIG. 10 depicts a flow diagram 1000 of an example process for automatically determining a target state for an adjustable characteristic of the adjustable structure 106 of the device 102, based on at least one monitored motion of the device 102. In some implementations, the steps shown may be performed on the device 102 by the adjustment module 132.

At 1002, at least one motion of the device 102 is monitored, and motion data is collected for the device 102. In some cases, the motion data is collected by one or more sensors of the device 102 such as the motion sensor(s) 122, and stored as the motion data 146. In some cases, the motion data may be collected by one or more external sources and provided to the device 102. The motion data may include information for a linear velocity or acceleration of the device 102 in any direction, information for an angular velocity or acceleration of the device 102 about any axis, information for a shaking, vibration, or oscillation of the device 102, or other types of motion data.

At 1004, a determination is made whether the motion exceeds a predetermined threshold value. For example, velocity or acceleration data may be examined to determine whether the motion is greater than a predetermined velocity or acceleration threshold for the device 102.

If the determination is positive, then at 1006 a target state for an adjustable characteristic of the adjustable structure 106 may be automatically determined. For example, if the velocity or acceleration of the device 102 exceeds a particular threshold, the adjustable structure 106 may be altered to be in a more compressible tactile state to cushion the device 102 from a potential impact with another object or due to a fall. At 1008, the surface characteristic is altered to place the adjustable structure 106 into the automatically determined target state, as described above. In some implementations, a portion of the adjustable structure 106 may be altered to be more compressible or more elastic to cushion against a potential impact. For example, an outer edge or side trim of the adjustable structure 106 may be altered to be more elastic prior to impact.

At 1010, the process may continue monitoring the motion of the device 102. If the determination at 1004 is negative, the process may proceed to 1010.

Figure 11:
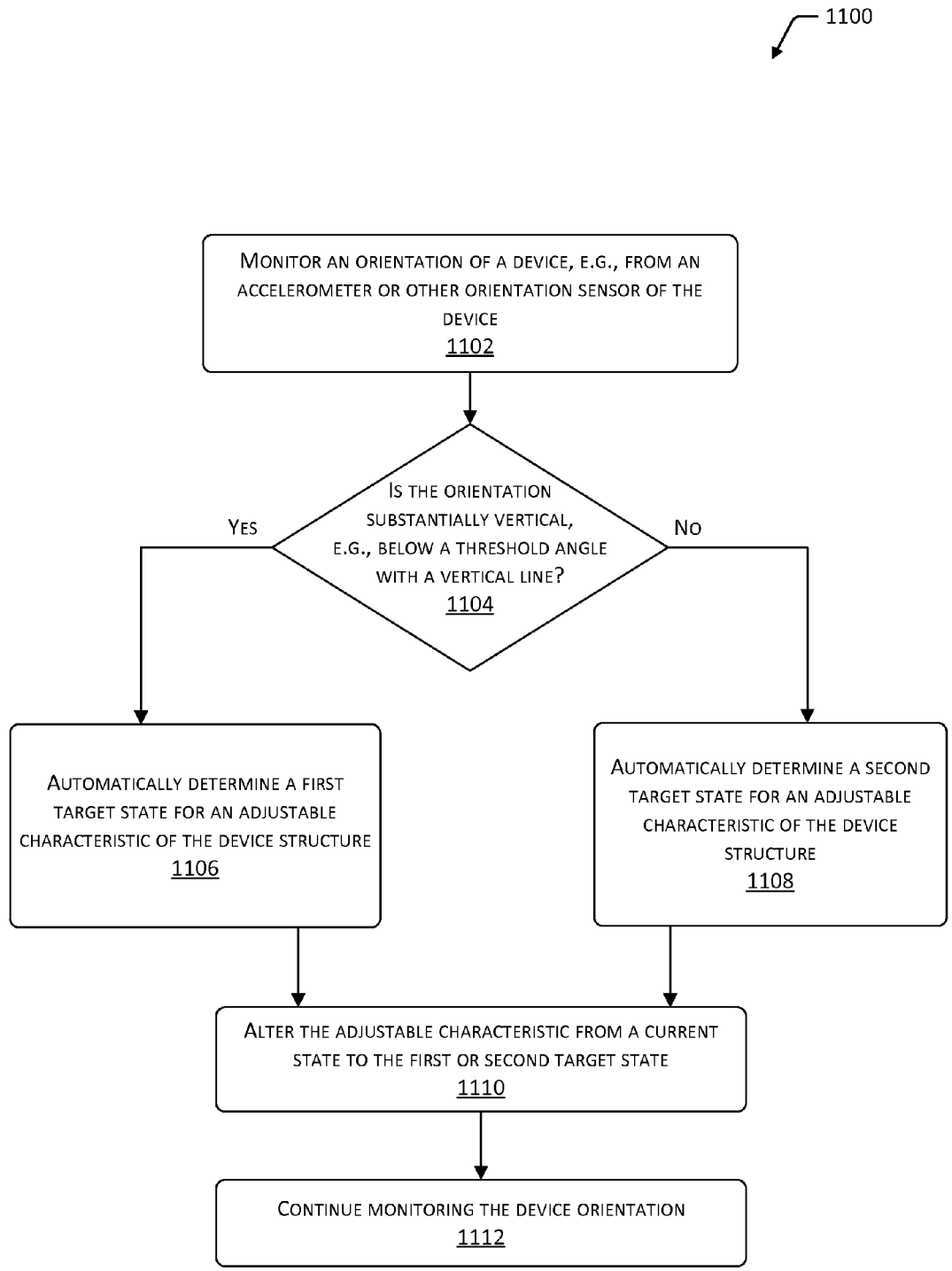
FIG. 11 depicts a flow diagram of an example process for automatically determining a target state for an adjustable characteristic of a device, based on at least one monitored orientation of the device.

FIG. 11 depicts a flow diagram 1100 of an example process for automatically determining a target state for an adjustable characteristic of the adjustable structure 106 of the device 102, based on at least one monitored orientation of the device 102. In some implementations, the steps shown may be performed on the device 102 by the adjustment module 132.

At 1102, at least one orientation of the device 102 is monitored, and orientation data is collected for the device 102. In some cases, the orientation data is collected by one or more sensors of the device 102 such as the orientation sensor(s) 124, and stored as the orientation data 148. In some cases, the orientation data 148 may be collected by one or more external sources and provided to the device 102. The orientation data 148 may include information for orientation of the device 102 relative to any direction. In some cases, the orientation data 148 may indicate an angular measure of the device 102 from a vertical direction, an angular measure of the device 102 from a horizontal direction, or other orientation data.

At 1104, a determination is made whether the device 102 is in a substantially vertical orientation. For example, this determination may be based on calculating an angle between the vertical direction and a plane that includes the display 106, and determining whether this angle is less than a threshold angle.

If the determination at 1104 is positive, at 1106 a first target state is automatically determined for an adjustable characteristic of the adjustable structure 106, based on the determination of the substantially vertical orientation of the device 102. If the determination at 1104 is negative, at 1108 a second target state is automatically determined for the adjustable characteristic, based on a determination of the substantially non-vertical orientation of the device 102.

In some implementations, the first target state may differ from the second target state. For example, the device 102 held substantially vertically may be more difficult for a user to grip than the device 102 held substantially non-vertically. To prevent dropping, the adjustable structure 106 may be altered to a rougher, more easily gripped surface when the device 102 is in a substantially vertical orientation. The adjustable structure 106 may revert to a smoother state when the device 102 is in a substantially non-vertical orientation.

At 1110, the adjustable characteristic of the adjustable structure 106 is altered from a current state to the automatically determined target state (e.g., the first or second target state determined at 1106 or 1108). This alteration may proceed as described above. At 1112, monitoring of the device orientation continues.

Figure 12:
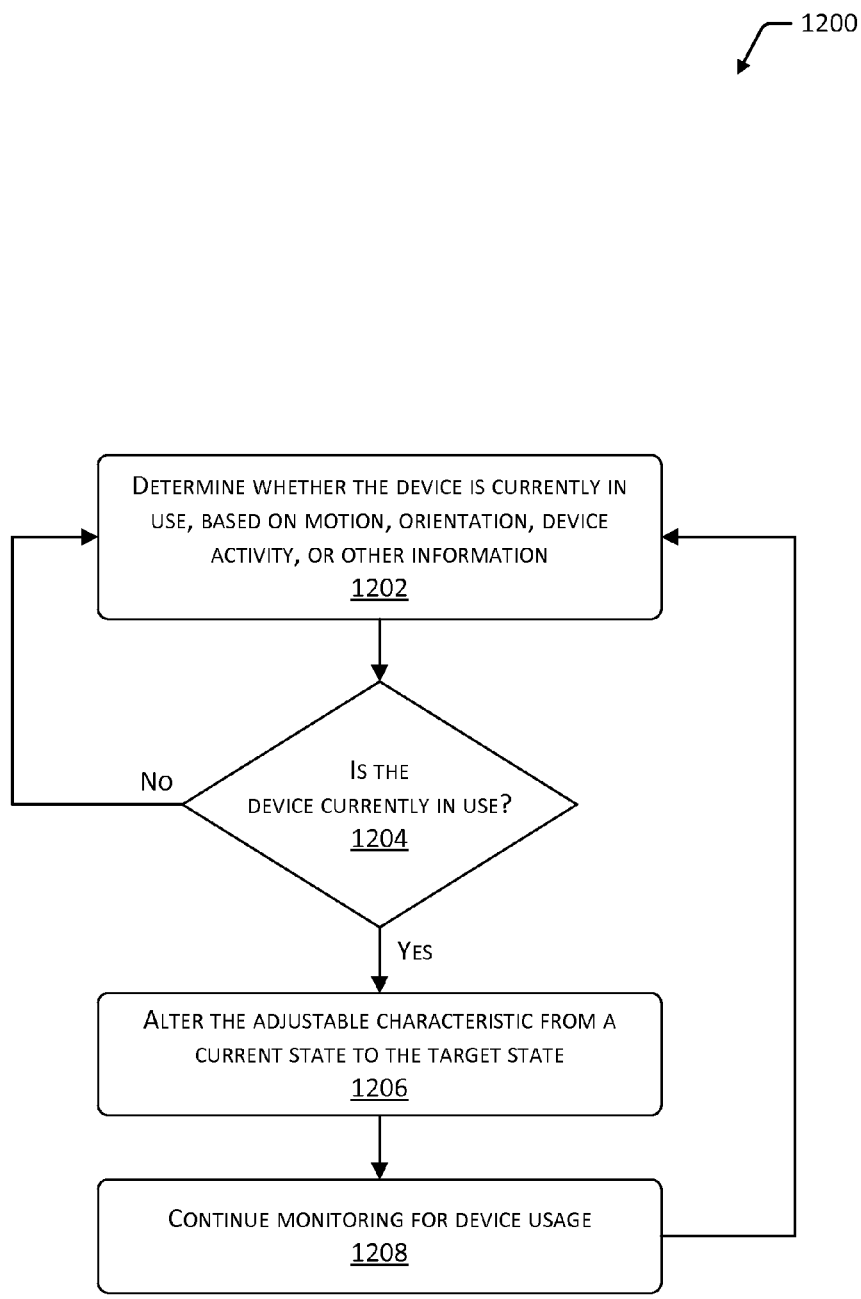
FIG. 12 depicts a flow diagram of an example process for automatically determining whether to alter an adjustable characteristic of a device, based on a detected usage of the device.

FIG. 12 depicts a flow diagram 1200 of an example process for automatically determining whether to alter an adjustable characteristic of the adjustable structure 106 of the device 102, based on a detected usage of the device 102. In some implementations, the steps shown may be performed on the device 102 by the adjustment module 132.

At 1202, a determination is made whether the device 102 is currently in use by a user. In some cases, this determination may be based on whether the device 102 is currently undergoing certain one or more motions as indicated by the motion data 146 collected by the motion sensor(s) 122 or by an external source. For example, a series of short-distance motions by the device 102 may be used to infer that the device 102 is in use. In some cases, the determination of device motion may be based on whether the device 102 is in an orientation, as indicated by the orientation data 148 collected by the orientation sensor(s) 124 or by an external source. For example, a determination that the device 102 is being held substantially vertically may be used to infer that the device 102 is in use. In some cases, the environmental data 144 may be used to determine whether the device 102 is in use. For example, a sensed pressure on a case of the device 102 may lead to an inference that the device 102 is being held by a user and that the device 102 is in use.

In some implementations, activity (or lack of activity) on the device 102 may lead to an inference that the device 102 is in use. For example, if one or more processes are currently executing, the device 102 may be determined to be in use. The determination may also be based on whether the device 102 is powered on or powered off, or whether the device 102 is in a sleep or hibernation state. In cases, where the device 102 is powered off, in a sleep state, or in a hibernation state, an inference may be made that the device 102 is not in use. The determination may also be based on whether a user is currently logged into, identified by, or authenticated to the device 102. Such circumstances may lead to an inference that the device 102 is currently in use.

In some implementations, the device 102 may be determined to be in use if it is determined that the device 102 is currently being held by a user or is in contact with a user, based on sensor data or process activity on the device 102 as described above. At 1204, if the device 102 is currently not in use, the process may return to 1102 and continue monitoring for device usage. If the device 102 is currently in use, then at 1206 an adjustable characteristic of the adjustable structure 106 may be altered from a current state to a target state, where the target state is determined as described above. At 1208, monitoring for device usage may continue. By altering the adjustable characteristic when the device 102 is in use, and not altering the adjustable characteristic when the device 102 is not in use, implementations may reduce a power usage of the device 102.

In some implementations, there may be a time delay separating a determination that the device 102 is not in use and when the adjustable structure 106 reverts to a default state or a not-in-use state. Such a time delay may prevent the device 102 from immediately reverting back to a default or not-in-use state in cases where the user briefly pauses in using the device 102. Moreover, in some implementations, the adjustable characteristic may be selectively altered based on an application currently executing on the device 102. For example, on determining that the device 102 is currently presenting multimedia content (e.g., a game or a video), the adjustable characteristic may be altered to a target state corresponding to such an activity.

Figure 13:
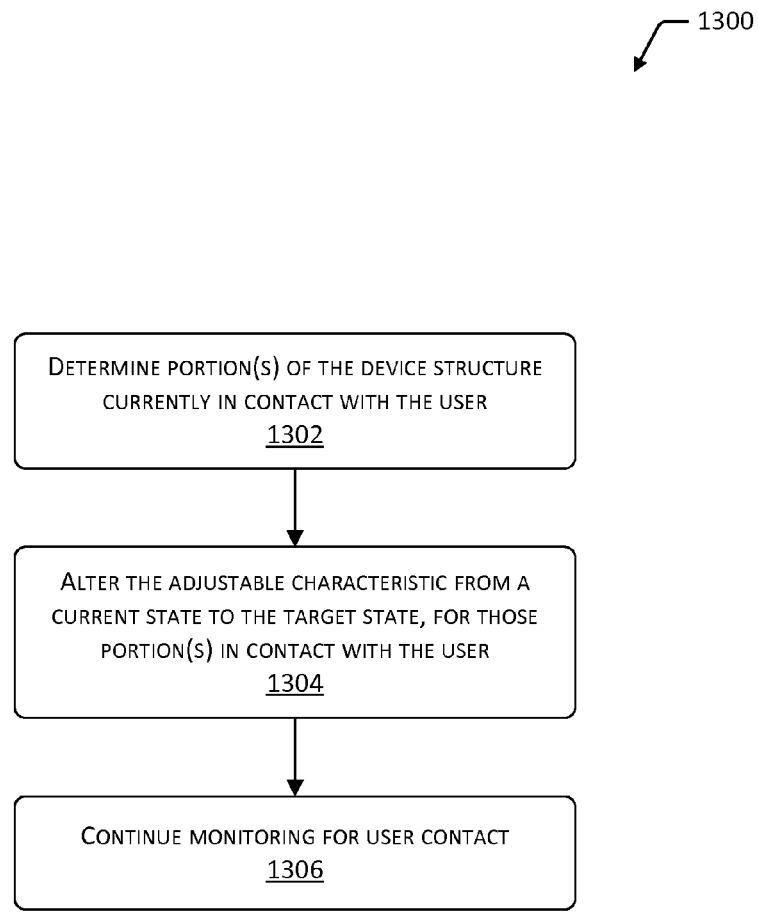
FIG. 13 depicts a flow diagram of an example process for determining one or more portions of a device structure to alter, based on detected user contact with the device.

FIG. 13 depicts a flow diagram 1300 of an example process for automatically determining to alter an adjustable characteristic of one or more portions of the adjustable structure 106 of the device 102, based on a detected user contact with those portions. In some implementations, the steps shown may be performed on the device 102 by the adjustment module 132.

At 1302, one or more portions of the adjustable structure 106 are determined to be in physical contact with a user of the device 102. In some cases, the environmental data 144 may be used to determine those portions in contact with a user. For example, a sensed pressure or temperature change on one or more portions of a case of the device 102 may lead to an inference that the device 102 is in contact with the user at those portions.

At 1304, an adjustable characteristic of the adjustable structure 106 may be altered in proximity to those portions determined to be in contact with a user. This alteration may proceed as described above. For example, a determination may be made of one or more portions of the adjustable structure 106 currently in contact with the user's hand, fingers, and so forth. Then, those portions may be altered to be rougher or smoother. In some cases, this alteration of an adjustable characteristic based on user contact may be further based on user preferences, as described with reference to FIG. 8. At 1306, monitoring for user contact may continue.

Those having ordinary skill in the art will recognize that certain steps or operations illustrated in the figures above may be eliminated, combined, subdivided, executed in parallel, or taken in an alternate order. Moreover, the methods described above may be implemented as one or more software programs for a computer system and are encoded in a computer-readable storage medium as instructions executable on one or more processors. Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Moreover, those having ordinary skill in the art will also recognize that certain structures or features illustrated in the figures above may be eliminated, combined, subdivided, or arranged in various configurations to implement the various techniques described above. Accordingly, the figures above should be viewed as examples and should not be viewed as limiting of implementations.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A device comprising:
a structure including a surface;
a material on an exterior of the surface, wherein the material is configured to change a compressibility of the material, a topology, or a shape of in response to a stimulus to provide the surface with a target tactile state;
a memory storing computer-executable instructions; and
a processor configured to execute the computer-executable instructions to cause the processor to:
receive an indication of the target tactile state of the surface, the target tactile state indicated by preference information stored on the device,
apply the stimulus to the material to alter the compressibility of the material such that the material provides the surface with the target tactile state; and
discontinue the stimulus after the surface is in the target tactile state,
wherein the tactile state persists after the stimulus is discontinued.

2. The device of claim 1, wherein:
the stimulus comprises an electrical signal; and
the material comprises an electrorheological material that alters its compressibility in response to the electric signal.

3. The device of claim 1, wherein the material further comprises:
a substrate material; and
an electrorheological material included as a dispersion in the substrate material, wherein the electrorheological material alters its compressibility in response to the stimulus to cause a tightening or loosening of the substrate material to provide the surface with the target tactile state.

4. The device of claim 1, wherein:
the stimulus comprises an application of thermal energy; and
the material comprises a thermoactive material that alters its compressibility in response to the thermal energy.

5. The device of claim 1, wherein:
the stimulus comprises a change in alkalinity; and
the material comprises a polyphosphazene that alters its compressibility in response to the change in alkalinity.

6. A device, comprising:
a structure comprising a material configured to change at least one characteristic in response to a stimulus, the at least one characteristic including a compressibility of the material;
a memory storing computer-executable instructions; and
a processor configured to execute the computer-executable instructions to cause the processor to:
receive an indication of a target state for the at least one characteristic; and
apply the stimulus to the material to alter the at least one characteristic to the target state by changing the compressibility of the material, such that the at least one characteristic persists in the target state after the applying of the stimulus.

7. The device of claim 6, wherein the at least one characteristic further comprises one or more of a texture, a coefficient of friction, a topology, or a shape of the material.

8. The device of claim 6, wherein the at least one characteristic further includes a visual characteristic that is one or more of a color, textual information, or a reflectance value of a visible surface of the at least one structure.

9. The device of claim 6, wherein:
the stimulus comprises an electric signal; and
the material comprises an electrorheological material that alters the compressibility in response to the electrical signal.

10. The device of claim 6, wherein the processor is further configured to:
determine an environmental factor at a location of the device, the environmental factor including one or more of a temperature, a humidity, or a local time; and
determine the target state for the at least one characteristic based at least partly on the environmental factor.

11. The device of claim 6, further comprising a motion sensor coupled to the processor, wherein the processor is further configured to:
receive, from the motion sensor, an indication of a motion of the device; and
based on the motion, determine the target state that is a higher compressibility than a current state of the structure.

12. The device of claim 6, further comprising an orientation sensor coupled to the processor, wherein the processor is further configured to:
receive, from the orientation sensor, data describing an orientation of the device; and
based on the orientation of the device, determine the target state for the compressibility of the structure.

13. The device of claim 6, wherein the processor is further configured to provide an interface for specifying the target state for the compressibility.

14. The device of claim 6, wherein the at least one characteristic of the structure retains the target state during at least one of a sleep state, a hibernation state, or a power off state of the device.

15. The device of claim 6, wherein the material includes one or more of an electrorheological material, an elastomeric material, a cholesteric material, a liquid crystal material, an electrophoretic material, an electroactive silicate material, or a microelectromechanical system (MEMS).

16. A device comprising:
an adjustable material configured to alter a compressibility of the adjustable material in response to a stimulus to provide the device with one or more tactile characteristics; and
a module configured to provide the stimulus to the material and receive an indication that the device has been provided with the one or more of the tactile characteristics, wherein the one or more of the tactile characteristics persists after providing the stimulus.

17. The device of claim 16, further comprising:
a substrate material;
wherein at least a portion of the adjustable material is disposed on an exterior surface of the substrate material to provide the exterior surface with the one or more of the tactile characteristics.

18. The device of claim 16, further comprising:
a substrate material;
wherein at least a portion of the adjustable material is disposed within an internal portion of the substrate material, and wherein alteration of the compressibility of the adjustable material provides the substrate material with the one or more of the tactile characteristics.

19. The device of claim 16, further comprising:
a substrate material;
wherein the adjustable material includes an electrorheological material as a dispersion in the substrate material, wherein the electrorheological material alters the compressibility in response to the stimulus to cause a tightening or loosening of the substrate material to provide the device with the one or more of the tactile characteristics.

20. The device of claim 16, wherein the adjustable material is configured to alter the compressibility in response to an alkalinity.

* * * * *